A. G. COOK.
NECK-YOKE.
No. 171,996. Patented Jan. 11, 1876.
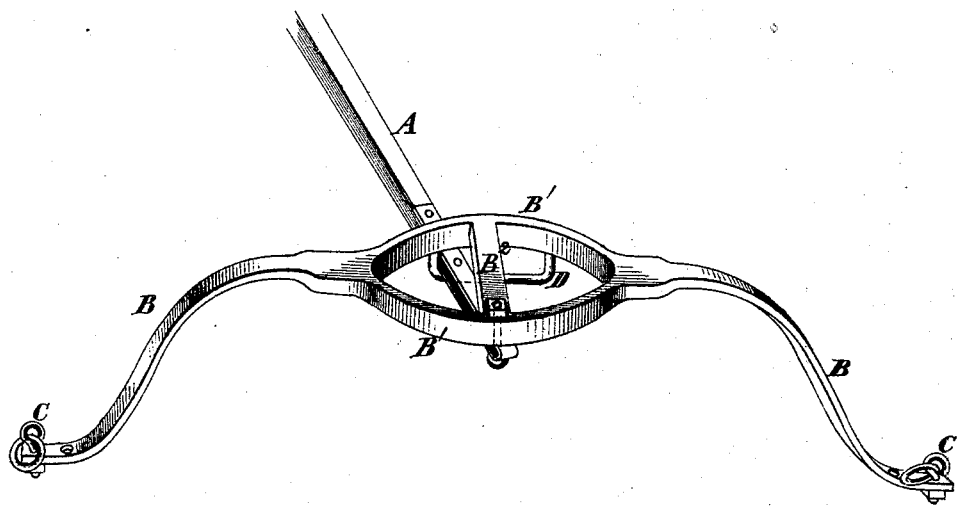

UNITED STATES PATENT OFFICE.

ABSALOM G. COOK, OF COLUMBUS, INDIANA, ASSIGNOR OF ONE-HALF HIS RIGHT TO MARY C. COOK, OF SAME PLACE.

IMPROVEMENT IN NECK-YOKES.

Specification forming part of Letters Patent No. 171,996, dated January 11, 1876; application filed February 6, 1874.

*To all whom it may concern:*

Be it known that I, ABSALOM G. COOK, of Columbus, in the county of Bartholomew and State of Indiana, have invented an Improvement in Neck-Yokes, of which the following is a specification:

The drawing accompanying this specification represents a neck-yoke made in accordance with my improved plan, and shows the yoke and a portion of the tongue of a vehicle.

This invention relates to a neck-yoke to be used in connection with plows, cultivators, carriages, and vehicles of all sorts, in connection with which two or more animals are used; and it consists in a neck-yoke, the central portion of which is curved, or otherwise elevated above the points where it is attached to the harness of the animals, and combining with such a yoke a staple, for the purpose of preventing the yoke from canting or tipping upon the tongue of the vehicle to which it is attached.

In constructing yokes of this character I use metal, wood, or any suitable material that is capable of being curved or bent, so as to cause its central portion to be elevated such a distance above its ends as to allow of its being upon the tongue of a cultivator or plow, when used for plowing or cultivating corn or other crops, without breaking the stalks, even when they have attained the height of several feet, it being peculiarly adapted for use in connection with that form of plows and cultivators which have curved or arched axles.

A in the drawing represents a portion of the tongue of the plow or other device, it being of any approved form, its outer end, by preference, having a plate or plates of metal placed upon its under and upper sides, to prevent its wear. The yoke B, as above stated, may be made of metal or of wood, but in either case it is to have its central portion elevated above its ends for any desired distance, in order that, when it is used in connection with any device for the cultivation of crops, that portion of it shall be curved above such crops, and thus the breaking of the stalks thereof be prevented.

The outer ends of this yoke are to be bent outward, as shown in the drawing, or otherwise extended horizontally, or nearly so, in order that they may be furnished with a series of holes for the reception of eye-bolts C C, or other suitable devices, for the reception of the strap which unites the harness of the animals therewith, or of a ring for that purpose. These holes are a means whereby the distance apart which the animals shall travel may be regulated, by putting the eye-bolts into those which are nearer together or those which are farther apart.

In order that this yoke may be prevented from tipping or canting upon the tongue its upper and central portion is divided, as shown at $B^1 B^1$, and it may have a cross-bar, $B^2$, formed or placed between the divided portion, as shown, for the purpose of strengthening it at that point. Upon the under surface of that portion $B^1$ of the yoke which is in the rear when in use, a staple, D, is placed, its length being such as to allow the yoke to turn upon the tongue of the vehicle, as one or the other of the animals travels faster than the other.

The distance which the staple D extends downward from the yoke is just sufficient to allow the tongue to pass freely between it and the under surface of the yoke, so that it may play freely between the two, its office being to prevent the tipping of the yoke, as it would otherwise have a tendency to do, owing to the fact that the tongue is secured to the front portion thereof, such securing being effected by passing the bolt down through said portion, and through the tongue, as shown, or it may be effected in any other suitable manner that will allow it to rise at the fulcrum, upon which the yoke shall swing.

Having thus described my invention, what I claim, and desire to secure by Letters Patent, is—

In combination with a neck-yoke, which is divided vertically at its center, the staple D, whereby it is prevented from tipping or turning, substantially as set forth.

In testimony whereof I have signed my name to this specification in the presence of two subscribing witnesses.

ABSALOM G. COOK.

Witnesses:
D. P. HOLLOWAY,
B. EDW. J. EILS.